US005387279A

United States Patent [19]

Conti et al.

[11] Patent Number: 5,387,279

[45] Date of Patent: Feb. 7, 1995

[54] LITHOGRAPHIC DAMPENING SOLUTION

[75] Inventors: Ronald S. Conti, New Lenox; Donatas Ramanauskas, Villa Park; Terry L. Dwyer, Des Plaines, all of Ill.

[73] Assignee: Varn Products Company, Inc., Oakland, N.J.

[21] Appl. No.: 44,703

[22] Filed: Apr. 12, 1993

[51] Int. Cl.$^{6}$ .......... C09K 3/18

[52] U.S. Cl. .......... 106/2; 101/451

[58] Field of Search .......... 106/2, 451

[56] References Cited

U.S. PATENT DOCUMENTS

| | | | |
|---|---|---|---|
| 3,354,824 | 11/1967 | Griffith et al. | 106/2 |
| 3,877,372 | 4/1975 | Leeds | 106/2 |
| 4,013,008 | 3/1977 | Brown | 106/2 |
| 4,030,417 | 6/1977 | Lipovac | 106/2 |
| 4,150,996 | 4/1979 | Druker et al. | 106/2 |
| 4,247,328 | 1/1981 | Lawson et al. | 106/2 |
| 4,278,467 | 7/1981 | Fadner | 106/2 |
| 4,548,645 | 10/1985 | Thiebaut | 106/2 |
| 4,560,410 | 12/1985 | Burns et al. | 106/2 |
| 4,563,952 | 1/1986 | Thiebaut | 101/451 |
| 4,854,969 | 8/1989 | Bassemir et al. | 106/2 |
| 4,906,296 | 3/1990 | Zweig | 106/2 |
| 4,938,800 | 7/1990 | Allen | 106/2 |
| 4,982,661 | 1/1991 | Zweig | 101/451 |
| 5,006,168 | 4/1991 | Modi et al. | 106/2 |
| 5,054,394 | 10/1991 | Zweig | 106/2 |
| 5,165,344 | 11/1992 | Matsumoto et al. | 106/2 |
| 5,221,330 | 1/1993 | Matsumoto et al. | 106/2 |
| 5,244,495 | 9/1993 | Doi et al. | 106/2 |

FOREIGN PATENT DOCUMENTS 90389 4/1991 Japan .

*Primary Examiner*—Helene Klemanski

*Attorney, Agent, or Firm*—Joseph G. Nauman; Sue Ellen Phillips

[57] ABSTRACT

The subject invention relates to an improved lithographic dampening solution comprising a diluted dampening solution concentrate having mixed therein a micro-emulsion formulation which spontaneously emulsifies upon mixing with the diluted dampening solution concentrate, the micro-emulsion formulation comprising a mono-, di-, or tripropylene glycol or other glycol having at least 3 carbons; a partially water soluble mono-, di-, or tripropylene glycol $C_1$ to $C_6$ alkyl ether; and, a wholly or partially water soluble polymer having an acid value of from about 5 to about 50. The subject invention further relates to a micro-emulsion formulation as previously stated or as stated hereinabove which further contains a nonionic surfactant of HLB 2-10 and a water soluble thickener. The invention further relates to a method for preparing the above-defined improved lithographic dampening solution.

13 Claims, No Drawings

LITHOGRAPHIC DAMPENING SOLUTION

BACKGROUND OF THE INVENTION

The subject invention relates to a lithographic dampening solution which contains a micro-emulsion forming component in combination with a dampening solution concentrate. More specifically, a microemulsion is formed when the formulas disclosed herein are combined with a diluted commercial dampening solution concentrate. Further, the formulation does not include isopropyl alcohol or equivalent replacements therefor which are toxic or flammable and, therefore, hazardous in use.

The lithographic offset printing process involves the use of water-based solutions, known as dampening solutions, to wet the non-image areas of the printing plate and thereby prevent hydrophobic inks from depositing in those non-image areas. This is referred to as dampening. The mechanical part of the printing press that meters the fountain or dampening solution to the printing plate is referred to as the dampening system.

Dampening systems have undergone a considerable evolution in the past 40 years. One long standing characteristic is that many dampening systems function better when isopropyl alcohol is added to the dampening solution at levels of 3% to 25%.

The functions of isopropyl alcohol have been investigated extensively. When mixed into press-ready dampening solutions, isopropyl alcohol is a poor solvent for inks used in lithography. This is important to the rheology of printing inks. Proper ink rheology is critical to achieving a quality printed sheet at acceptable production rates. Many dampening systems are designed to mill a quantity of dampening solution into the ink during the lithographic printing process. Other dampening systems result in the incidental milling of dampening solution into ink. The milling of the ink and the dampening solution forms a water-in-oil emulsion. The poor ink solvency of isopropyl alcohol helps prevent excessive change in the rheological characteristics of inks that contain emulsified dampening solution. A further function of isopropyl alcohol is control of both the amount and the particle size of dampening solution which is emulsified into the printing ink. This characteristic has been difficult to achieve in conventional substitutes for isopropyl alcohol.

Other desirable properties of isopropyl alcohol include: (1) controlled increase of dampening solution viscosity allowing cohesive and uniform wet films to be pulled through the rollers of the dampening system; (2) controlled decrease in dynamic surface tension due to isopropyl alcohol acting as a bulk surface tension modifier; (3) reduction of the water settings on the press, which in turn enhances ink drying time; and, (4) universal application on the numerous different designs of dampening systems, used in the industry.

Isopropyl alcohol, however, presents a serious environmental problem in that it evaporates readily and quickly fills the atmosphere of printing shops. Isopropyl alcohol is a volatile organic compound at 6.7 pounds V.O.C. per gallon. Its use in printing systems is at fairly high levels, from 3% to 25% of the dampening solution, usually from 15% to 20% thereof. Isopropyl alcohol also presents problems due to its flammable nature. Federal legislation on air pollution has focused on reducing or eliminating emissions of isopropyl alcohol, as it is considered a volatile organic compound.

A number of replacements for isopropyl alcohol, as it is used in lithographic offset printing, have been suggested. In U.S. Pat. No. 4,560,410 a mixture of polyol and a partially water soluble glycol ether and a polyol and a completely water soluble glycol ether is described. A feature of this patent is the use of ethylene glycol, ethylene glycol ethers and 2-ethyl-1,3-hexanediol, all of which have some level of toxicity, and are affected by current legislation.

U.S. Pat. No. 5,006,168 describes the use of a water soluble cellulose ether as an alcohol substitute. This patent admits the need for isopropyl alcohol in some applications and therefore does not provide all the functional benefits of isopropyl alcohol modified dampening solutions.

A wide variety of nonionic compounds, mostly solvents, are listed in U.S. Pat. No. 4,278,467 as substitutive additives for isopropyl alcohol, 2-butoxyethanol being one of those identified therein. In fact, 2-butoxyethanol is one of the most widely used and effective replacements for isopropyl alcohol. This is attested to by years of use in the lithographic printing industry. 2-butoxyethanol is fairly effective and is used at much lower concentrations than isopropyl alcohol.

However, 2-butoxyethanol, not unlike isopropyl alcohol, has a drawback in that it has been shown to be toxic (ACGIH, TLV, 25 ppm [Skin]) and is readily absorbed through the skin in toxic amounts. The threshold limit value of 25 ppm for skin is fairly low and dampening solutions with 2-butoxyethanol typically contain a high level of 0.5% to 5% for effectiveness. Recent Federal legislation (1990 Clean Air Act Amendments) has identified 2-butoxyethanol and all ethylene glycol ethers as hazardous air pollutants with the goal being elimination of these solvents in coming years. Acceptable use levels or concentrations of most alcohol substitutes, especially 2-butoxyethanol, is limited because of resultant drastic changes in ink rheology, i.e. relatively low levels are used compared to isopropyl alcohol. For instance, 2-butoxyethanol has a limit of 0.5% to 5% of the dampening solution, as compared to isopropyl alcohol which is used at 3% to 25% and most often at 15% to 20% of the dampening solution.

The development of a true alternative to the use of isopropyl alcohol has been an elusive goal. All alternatives developed to this date have been deficient in achieving all of the desired characteristics of isopropyl alcohol.

It has remained for the invention described herein to resolve the technical problems associated with achieving performance equivalence to the use of isopropyl alcohol in lithographic printing without the attendant disadvantages of isopropyl alcohol use.

SUMMARY OF THE INVENTION

The subject invention relates to an improved lithographic dampening solution comprising a diluted dampening solution concentrate having mixed therein a micro-emulsion formulation which spontaneously emulsifies upon mixing with the diluted dampening solution concentrate, the micro-emulsion formulation comprising a mono-, di-, or tripropylene glycol or other glycol having at least 3 carbons; a partially water soluble mono-, di-, or tripropylene glycol $C_1$ to $C_6$ alkyl ether; and, a wholly or partially water soluble polymer having an acid value of from about 5 to about 50.

The subject invention further relates to a micro-emulsion formulation as previously stated or as stated hereinabove which further contains a nonionic surfactant of HLB 2-10 and a water soluble thickener.

The invention further relates to a method for preparing the above-defined improved lithographic dampening solution.

DETAILED DESCRIPTION OF THE INVENTION

The subject invention is an improved lithographic dampening solution comprised of the disclosed micro-emulsion formulation in combination with a commercial dampening solution concentrate. The resultant improved dampening solution provides all of the advantages of an isopropyl alcohol- or 2-butoxyethanol-modified dampening solution, but poses none of the usual physical and health hazards thereof. The subject formulation is very low in air emissions of V.O.C. Use of this formulation completely eliminates the use of isopropyl alcohol and 2-butoxyethanol in lithographic printing.

Compared to dampening solutions which include conventional isopropyl alcohol substitutes, the inclusion in a dampening solution of the subject formulation provides equivalent or improved print quality. Further, use of this formulation affords quicker start ups and produces less paper waste.

The subject formulation also affords the user the advantage of using more exact amounts of dampening solution components and, therefore, of reducing waste and cost of the components. This advantage is a function of: (1) reduced evaporation rates; and, (2) the formulation spontaneously emulsifying, thus ensuring immediate proper distribution of formulation components without the usual drawbacks of dampening solution starvation or excess on the non-image areas of the printing plate.

The invention is a micro-emulsion formulation comprised of: (1) from about 20% to about 60% of mono, di, or tripropylene glycol or other glycols of $C_3$ or greater; (2) from about 5% to about 50% of a partially water soluble mono, di, or tripropylene glycol $C_1$ to $C_6$ alkyl ether; (3) up to about 10% of a nonionic surfactant of HLB 2-10; (4) from about 2% to about 50% of a wholly or partially water soluble polymer of acid value 5 to 50; (5) from about 0o1% to about 10% of an optional water soluble thickener; and, (6) from about 5% to about 60% water, which is a necessary diluent to control the concentration of the active ingredients and form the micro-emulsion.

The percentages mentioned throughout this specification are by weight percent of the total micro-emulsion formulation unless otherwise specified. This formulation provides all of the functional benefits of isopropyl alcohol on a wide variety of lithographic printing presses fitted with different dampening systems when used as a part of, or added as a second part to, a diluted commercially available lithographic dampening solution concentrate of pH 3.4 to 9.0.

The subject formulation contains from about 20% to about 60% of a mono-, di-, or tripropylene glycol or other glycol having at least 3 carbons. Preferably, the formulation contains from about 35% to about 50% and most preferably from about 40% to about 45% of the glycol component. This component functions as a coupling agent for the polymer, glycol ether and surfactant components of the formulation. Exemplary of this component are propylene glycol and dipropylene glycol, such as those available commercially from Dow Chemical, Union Carbide, and Arco. Other suitable glycols include 1,3-trimethyl propane diol, 2-methyl-1,3-propane diol, and neopentyl glycol.

The formulation further contains from about 5% to about 50%, preferably from about 5% to about 20%, and most preferably from about 10% to about 15%, of a partially water soluble mono-, di-, or tripropylene glycol $C_1$ to $C_6$ alkyl ether. The glycol ethers contemplated for use herein demonstrate increased effectiveness over isopropyl alcohol due to partial water solubility. Partial water solubility results in greater concentrations of this component of the formulation at the critical interfacial regions than that which would occur with wholly water soluble substances. Consequently, the partially water soluble glycol ether may be used in lesser amounts, as compared to the amount of isopropyl alcohol that would be used, to achieve the same interfacial effects as 15% to 20% isopropyl alcohol. Examples of suitable glycol ethers are tripropylene glycol n-butyl ether, dipropylene glycol n-butyl ether, propylene glycol n-butyl ether, and propylene glycol t-butyl ether. These components are available commercially from Arco and Dow Chemical.

Up to about 10% by weight of the micro-emulsion may be a nonionic surfactant having a hydrophilic-lipophilic balance (HLB) of between 2 and 10. Preferably, the emulsion contains from about 2% to about 4% nonionic surfactant. This component, however, is not required to be present. When used, addition of the nonionic surfactant to the formula enhances the wetting action and performance of the dampening solution and consequently enhances the lithographic printing process. Suitable surfactants for use in the subject micro-emulsion include ethoxylated tetramethyl decyne diol, such as Surfynol®440 available commercially from Air Products, propylene oxide/ethylene oxide block copolymer such as Pluronic® L available commercially from BASF, and nonionic alkylphenoxy poly-(ethylene oxide) alcohols such as Makon® NF, available commercially from Stepan. Other commercially available nonionic surfactants include Silwets 7001 & 7500®, Tetronic® 1101, Igepal®-CO Series, Triton D Series®, Desonic®, and Tergitol® Series.

The micro-emulsion formula also contains from about 2% to about 50%, preferably from about 2% to about 15% and more preferably from about 51% to about 10%, of a wholly or partially water soluble polymer having an acid value of from 5 to 50. This polymer functions as a bulk surface tension modifier and/or a thickener. Carboxymethyl cellulose ether, modified hydroxypropyl cellulose, polyesters, and polyacrylates are examples of appropriate polymers, all of which are commercially available.

A water soluble thickener, such as Union Carbide Polyox®, Rohm & Haas Acusols, and Carbopol from B. F. Goodrich may optionally be added in amounts of from about 0.1% to about 10% by weight of the micro-emulsion. Other suitable thickeners known to those skilled in the art may be used.

It is desirable to dilute a mixture of the foregoing components in water. Left undiluted, the micro-emulsion formulation which is the subject hereof will not properly mix or spontaneously emulsify in diluted dampening solution concentrate. It is preferable to dilute the dampening solution concentrate to from about 2% to about 6% by volume prior to addition of the micro-emulsion formula. This enhances proper dispersion of the micro-emulsion throughout the solution.

Lithographic dampening solution concentrates are well-known and are described in the literature. These concentrates are typically comprised of mixtures of buffer salts, desensitizing polymers (e.g., gum arabic, cellulose ethers), desensitizing salts, and other additives, such as surfactants, microbiocides, and dyes.

When added to diluted lithographic dampening solution concentrates, compositions which fall within the formulation of this invention are spontaneously emulsified and form a stable micro-emulsion without the need for mechanical emulsification. Given this tendency to spontaneously emulsify, use of the formulation affords the user the opportunity to use the formulation in more exact amounts because spontaneous emulsification ensures delivery of all of the active ingredients to printing surfaces as necessary. This means reduced ink attack and even distribution of the partially water-soluble ingredients throughout the formulation.

No adaptive time period is required by a press operator in using the subject micro-emulsion formulation. Best print results are achieved using lower Durometer hardness of rollers, i.e. about 20–30 Shore A hardness is preferred. Further, the dampening solution performs best when used at about 45° F. to about 60° F.

Dampening solutions made with these micro-emulsion formulations offer yet other considerable and unexpected advantages. They perform with all of the advantages of isopropyl alcohol, but without the toxicity hazards thereof. Further, these solutions are stable when added to commercially available dampening solution concentrates diluted with water. Preferably, the subject formulation is added to diluted dampening solution concentrate to yield a dampening solution containing up to about 7% by volume of the subject formulation. The concentrates typically contain high concentrations of nitrate, phosphate, and other salts which cause de-stabilization of emulsions. The micro-emulsion form of the subject formulation allows for greater effectiveness of the overall dampening solution and yields lower V.O.C. emissions. This greater effectiveness is due to a number of factors, including minimal changes in ink rheology due to emulsification of the dampening solution into the ink, increased viscosity and wet film integrity of the dampening solution which is controlled by the micro-emulsion, and reduction of dynamic surface tension where the micro-emulsion acts as a bulk surface tension modifier. Also, the micro-emulsion adds lubricity which reduces heat build-up due to friction.

The following formulations are micro-emulsion formulations in keeping with the subject disclosure. In each formulation, designated A–D, the formulation was prepared by mixing the ingredients in a vessel with a propeller type mixer. After vigorous agitation, the mixture was ready for addition to a diluted dampening solution concentrate, the resulting mixture to be charged to a printing press for use therein. Typically, the dampening solution to which the subject formulation was added was prepared by mixing a commercial dampening solution in the concentrate form with water.

| Component | % By Weight |
|---|---|
| Formulation A: | |
| Water | 37 |
| Dipropylene Glycol | 43 |

-continued

| Component | % By Weight |
|---|---|
| Carboxymethyl cellulose ether (Ambergum ® 1221) | 5 |
| Tripropylene glycol n-butyl ether | 13 |
| Ethoxylated tetramethyl decynediol (Surfynol ® 440) | 2 |
| TOTAL: | 100 |
| Formulation B: | |
| Water | 29 |
| Propylene Glycol | 43 |
| Modified hydroxypropyl cellulose (Ambergum ® D-3085) | 13 |
| Dipropylene glycol n-butyl ether | 13 |
| Ethoxylated tetramethyl decynediol (Surfynol ® 420) | 2 |
| TOTAL: | 100 |
| Formulation C: | |
| Water | 28 |
| Propylene Glycol | 43 |
| Polyacrylic Acid (Acrysol A-1) | 5 |
| Propylene Glycol n-butyl ether | 15 |
| Propylene oxide/Ethylene oxide block copolymer (Pluronic L) | 3 |
| TOTAL: | 100 |
| Formulation D: | |
| Water | 30 |
| Propylene Glycol | 44 |
| Modified hydroxypropyl cellulose (Ambergum ® D-3085) | 12.5 |
| Dipropylene glycol n-butyl ether | 12.5 |
| Nonionic, water soluble, poly(ethylene oxide) (Polyox ® WSRN-K) | 1 |
| TOTAL: | 100 |

By way of example, 2 ounces of the formulation set forth as Formulation B was added to a dampening solution comprised of 2 ounces of Total Chrome Free ® dampening solution concentrate mixed with one gallon of deionized water. The resultant dampening solution was used in the dampening system of a two-unit Heidelberg 28″ SORMZ sheetfed printing press. Through prolonged press runs, this dampening solution yielded improved print quality, i.e. better ink density on the printed sheet and sharper dots, lower water settings, and reduced emulsification as compared to 2-butoxyethanol modified dampening solutions.

In another Example, 3 ounces of Formulation D prepared as previously described, was added to a dampening solution comprised of 3 ounces of Litho Etch ® 142 W dampening solution concentrate mixed with one gallon of reverse osmosis treated water. The resultant dampening solution was used in the Alcolor dampening system of a 2 unit Heidelberg sheetfed press. A comparison was made with a second dampening solution made of 3 ounces of Litho Etch ® 142 W, one gallon of reverse osmosis treated water, and 25 ounces of isopropyl alcohol. The dampening solution using formulation D yielded equivalent or improved print quality, lower dampening settings on the press, reduced V.O.C. emissions, and improved indoor air quality.

That the subject micro-emulsion is a universal replacement for isopropyl alcohol is attested to by its use on a wide variety of lithographic offset printing presses fitted with many different dampening system devices. The different types of printing presses on which the examples of the invention have been successfully used for prolonged periods include: (1) Akiyama, 28″ 4-color, sheetfed press with Akiyama continuous dampening system; (2) Aurelia, 40″ 6-color, sheetfed press with Micro-flo dampening system; (3) Didde-Glazer, Model 175, 17.5", web press, no heat, with Dahlgren dampening system; (4) Didde-Glazer, web press, no heat, with Quadro-flo dampening system; (5) Hantscho, 30" web, no heat; (6) Hantscho, web press, heatset, with Bareback dampening system; (7) Harris, Model Ml10, web press, no heat, with Harris continuous dampening system; (8) Harris, 60", sheetfed press with Dahlgren dampening system; (9) Heidelberg, SORM, 20" 1-color sheetfed press with Alcolor dampening system; (9) Heidelberg, Speedmaster, 40"2-color, sheetfed press with Alcolor dampening system; (10); Heidelberg, S-series, 28", 2-color sheetfed press with Alcolor dampening system; (11) Heidelberg, 40", sheetfed press with Dahlgren dampening system; (12) Heidelberg, SORK, 26", 5-color, sheetfed press with Conventional dampening system; (13) Heidelberg, MOZ, 26", 5-color sheetfed press with Alcolor dampening system; (14) Heidelberg, MOFP, 26", 5-color, sheetfed press with Alcolor dampening system; (15) Heidelberg, GTO, 5-color, sheetfed press with Alcolor2 dampening system; (16) Heidelberg, SORMZ, 2-color, sheetfed press with Alcolor dampening system; (17) Komori, Lithrone40 40", 6-color sheetfed press with Komorimatic dampening system; (18) Komori, Sprint, 5-color, sheetfed press with Auto-Damp dampening system; (19) Man-Roland, 40", 4-color, sheetfed press with Rolandmatic dampening system; (20) Miehle, Super43/60, 60", 7-color, sheetfed press with. Miehle-matic dampening system; (21) Miehle, 40", 2-color, sheetfed press with Dahlgren dampening system; (22) Miller, Perfector, 4-color, sheetfed press with Dahlgren dampening system; (23) Miller, 40", 4-color, sheetfed press with Millermatic dampening system; (24) Miller, TP104, 6-color, sheetfed press with Dahlgren dampening system; 925) Mitsubishi, 40", 5-color sheetfed press with Mitsubishi continuous dampening system; (26) Roberts & Porter, H640, 6-color, sheetfed press with Omsca Poli-flo dampening system; (27) Royal Zenith, Planeta, 60", 6-color, sheetfed press with Dahlgren dampening system; (28) Royal Zenith, Planeta, 60", 6-color sheetfed press with Vari-damp dampening system; (29) Royal Zenith, Planeta Polygraph, 60", 6-color, sheetfed press with Dahlgren dampening system; (30) Whitaker, Envelope, 1-color, sheetfed press with continuous dampening system; and, (31) AB Dick 360 with Super-Aquamatic.

While certain representative embodiments of the invention have been demonstrated herein, they are intended to be illustrative and to aid those skilled in the art in carrying out the subject invention. They are not intended to be limitative thereof, and it will be apparent to those skilled in the art that various changes may be made therein without departing from the spirit and scope of the invention as set forth in this specification and in the claims appended hereto.

Having described the invention, the following is claimed:

1. An improved lithographic dampening solution comprising a diluted dampening solution concentrate having mixed therein a micro-emulsion formulation which spontaneously emulsifies upon mixing with said diluted dampening solution concentrate, said micro-emulsion formulation comprising from about 20% wt. to about 60% wt. of a mono-, di-, or tripropylene glycol or another glycol having at least 3 carbons, from about 5% wt. to about 50% wt. of a partially water soluble mono-, di-, or tripropylene glycol $C_1$–$C_6$ alkyl ether, from about 2% wt. to about 50% wt. of a wholly or partially water soluble polymer having an acid value of from about 5 to about 50 and from about 1% wt. to about 10% wt. of a nonionic surfactant of HLB 2-10.

2. The solution of claim 1 wherein said solution contains from about 35% wt. to about 50% wt. of said mono-, di-, or tripropylene glycol or other glycol having at least 3 carbons.

3. The solution of claim 1 wherein said solution contains from about 5% wt. to about 20% wt. of said partially water soluble mono-, di-, or tripropylene glycol C1–$C_6$ alkyl ether.

4. The solution of claim 1 wherein said solution contains from about 2% wt. to about 15% wt. of said wholly or partially water soluble polymer having an acid value of from about 5 to about 50.

5. The solution of claim 1 wherein said solution further contains from about 2% wt. to about 4% wt. of a nonionic surfactant of HLB 2-10.

6. The solution of claim 1 wherein said solution further contains from about 0.1% wt. to about 10% wt. of a water soluble thickener.

7. An improved lithographic dampening solution comprising a diluted dampening solution concentrate having mixed therein a micro-emulsion formulation containing about 29% wt. water, about 43% wt. propylene glycol, about 13% wt. modified hydroxypropyl cellulose, about 13% wt. dipropyleneglycol-n-butyl ether, and about 2% wt. ethoxylated tetramethyl decyne diol.

8. A method for improving lithographic print quality and reducing V.O.C.s comprising preparing a micro-emulsion formulation by mixing from about 20% wt. to about 60% wt. of a mono-, di-, or tripropylene glycol or a glycol having at least 3 carbons, from about 5% wt. to about 50% wt. of a partially water soluble mono-, di-, or tripropylene glycol $C_1$–$C_6$ alkyl ether, from about 2% wt. to about 50% wt. of a wholly or partially water soluble polymer having an acid value of from about 5 to about 50, and from about 1% wt. to about 10% wt. of a nonionic surfactant of HLB2-10, and adding said formulation to a dampening solution concentrate diluted up to about 10% by volume in water such that said micro-emulsion formulation spontaneously emulsifies upon addition to said diluted dampening solution concentrate and is present as up to about 7% by volume of the total dampening solution.

9. The method of claim 8 wherein said micro-emulsion formulation contains from about 35% wt. to about 50% wt. of said mono-, di-, or tripropylene glycol or other glycol having at least 3 carbons.

10. The method of claim 8 wherein said micro-emulsion formulation contains from about 5% wt. to about 20% wt. of said partially water soluble mono-, di-, or tripropylene glycol $C_1$–$C_6$ alkyl ether.

11. The method of claim 8 wherein said micro-emulsion formulation contains from about 2% wt. to about 15% wt. of said wholly or partially water soluble polymer having an acid value of from about 5 to about 50.

12. The method of claim 8 wherein said micro-emulsion formulation further contains from about 2% wt. to about 4% wt. of a nonionic surfactant of HLB 2-10.

13. The method of claim 8 wherein said micro-emulsion formulation further contains from about 0.1% wt. to about 10% wt. of a water soluble thickener.

* * * * *